Patented Aug. 30, 1949

2,480,769

UNITED STATES PATENT OFFICE 2,480,769

MILKWEED SEED OIL

Cortes F. Reed, Anoka, Minn., assignor to Federal Cartridge Corporation, Minneapolis, Minn., a corporation of Minnesota No Drawing. Application February 21, 1944, Serial No. 523,357

9 Claims. (Cl. 260—412.2)

The present invention relates to a process of preparing oil from milkweed seed. Considerable interest has been evoked of recent years in the milkweed, both as a source of rubber and as a source of vegetable fiber. It has now been discovered that a valuable oil can be recovered from the seed of the milkweed and may be used for edible purposes as well as for preparing protective coatings.

The milkweed seed is of the samara type having a thin fin extending around the seed. I have discovered that by removing the fin and by controlling to some extent the moisture content of the seed, it is possible to press out practically all of the oil of the seed. The oil possesses an excellent appearance and taste, resembling that of first pressing olive oil, and was found to be an excellent salad oil. By suitable heat or chemical treatment the oil can be bodied or partially polymerized and as such is applicable for protective coatings.

It is, therefore, an object of the present invention to provide a process of recovering valuable oil products from milkweed seed. It is another object of the present invention to provide a process of recovering oil from milkweed seed useful for edible purposes, as well as for protective coatings. It is a further object of the present invention to provide a process of removing fins from the milkweed seed.

These and other objects of the present invention will be readily apparent from the description thereof with particular reference to various examples which are to be understood as illustrative only and in no sense limiting the invention.

The seeds may be prepared for processing as follows: The pods may be collected from the plants by hand or by a suitable harvesting machine. I have discovered that the simplest way found to recover the seed from the pod has been to pass the entire pod (hull, floss, seed) into a centrifugal type fan or blower, the impeller of which is operating at a peripheral velocity of 5000 ft. or over per minute. The impact of the blades and fan housing on the pods is sufficient to open the pods, dislodge the floss and detach the seeds. The discharge from the blower is then passed through a "cyclone" separator in which the seed and hulls are separated from the floss, an accelerated air flotation separation, the floss passing out the upper discharge vent along with the air and the seed and hulls from the bottom. The seed and hulls can be separated by customary screening procedure. This method and the apparatus therefor are the subject of a copending application.

During this step of the process, the moisture content is preferably controlled to between 10 and 25 per cent. At lower moisture contents, excessive breakage of floss and seed results, whereas at higher moisture contents, the material may heat in storage.

I have discovered that it is difficult, if not impossible, to obtain any reasonable yield of oil from the seed if the fin is not removed, and in my process the seeds are treated to remove the fin. This may be accomplished by milling in, for example a ball mill, or shaker mill, or the fins may be knocked off by passing them through a straight bladed centrifugal fan operating at high speeds. Likewise, any appreciable water content in the seed will prevent satisfactory yields of oil during pressing.

The seed, before the removal of the fin, has the following approximate composition: Protein, 33%; oil, 21%; ash, 3.7%; Dextrin-like product, approximately 2%; and wax constituents, 3 to 5%. After removal of the fins, which amount to 15 to 17% of the matured seeds, the protein content is increased to 39 to 40%; the oil and wax content to 28 to 30%, while the ash and other constituents remain fairly constant.

The step of removing the fins is extremely important, as seeds with the fin attached have been subjected to pressures up to 30–40 tons per square inch without any appreciable amount of oil being obtained. Likewise, the natural water content of the seed must be reduced before any satisfactory yield of oil can be obtained by pressing. Seed pressed while containing its natural moisture content, about 8%, yielded no oil when subjected to pressures of the magnitude of those mentioned above. The moisture content should be reduced to below the maximum of about 8%, and preferably between 2 and 5%. When the fin has been removed and the moisture content is below the maximum set forth above, oil yields range from 16–25% by weight of the definned seed.

For the pressing operation the seed is ground to a small size, preferably 30–40 mesh, preferably on a differential speed roller mill. At particle sizes outside this range, it has been found that lower yields of oil are obtained.

The following examples will serve to illustrate the various steps of the invention:

FIN REMOVAL

Example I

In this example the seeds were definned by tumbling with shot. 100 gms. of seed and 100 gms. of steel air rifle shot were tumbled for two minutes with a back and forth motion at the rate of about 100 strokes per minute. The product was separated by screening through a 14 mesh screen and the shot were removed magnetically. The two-minute tumbling treatment removed about 13½% of the original weight of the seed as fins. Another run with a three-minute tumbling treatment removed 14% of the weight of the whole seed as fins.

*Example II*

Two hundred (200) gms. seed and 1500 lead buckshot, average weight 3½ gms., were tumbled by a similar procedure for 3½ minutes. The product was passed through a 4 mesh screen to remove the shot after which the product was passed through a 14 mesh screen to remove fins. This treatment resulted in the removal of about 15% of the weight of the original seed as fins. The apparent densities of the seed before and after tumbling were 0.252 and 0.495 respectively.

*Example III*

Three hundred (300) gms. of seed were passed through a centrifugal fan, in this instance an ordinary vacuum cleaner, and were then discharged into a cyclone separator of appropriate size. The seeds were removed from the bottom of the separator and the fins were exhausted through the top with the air. This procedure resulted in the removal of about 16% of the original weight of the seed as fins. By repeating this operation on the same seeds, an additional removal of about 1% was obtained.

OIL PRESSING

*Example IV*

Fifty (50) gms. of definned seed were boiled in water, drained and dried to constant weight at 110° C. The seed was then ground by passing it through rolls operating at differential speeds. The seeds were passed through the rolls four times, at which time they were reduced to from 40-60 mesh. This particle size is only approximate as the oiliness of the seed prevented a more accurate determination of the particle size. The ground seed was then reheated to about 100-110° C. and then pressed at 3000 lbs. per square inch for about 6 minutes. 20% of the weight of the seed was obtained as oil. It was bright in color like first pressing olive oil, and was an excellent salad oil. The step of heating the seed before pressing is believed to be responsible for the pleasant nutty flavor of the oil. The raw seed on the other hand had a characteristic bitter taste.

*Example V*

Fifty (50) gms. of seed from which the fins had been removed, as in Example III, were dried and ground and the seed was subjected to between 5-6 tons per square inch pressure for 19 hours during which time the temperature was normal room temperature (approximately 18° C.). Approximately 10 gms. (20%) of oil of light yellow (greenish cast) color resembling olive oil was obtained. It was mild tasting and made a good salad oil. 50 gms. of definned and similarly ground seed meal were placed in a pressure cylinder and the cylinder, containing the charge of seed, was placed in an oven and heated to 105° C. for two hours after which pressure was applied while the seed and pressing cylinder were still hot. At about 1000 lbs. per square inch pressure, oil began to flow and continued for about six minutes when the pressure had reached about 6 tons per square inch. Approximately 12.32 gms. (24.6%) of oil was obtained by this hot-pressing procedure. The oil so obtained contained some of the natural waxes of the seed, which appeared to be soluble in the hot oil and were hence removed along with the oil. The final cake weighed about 37.7 gms. and was hard, dense and had the appearance of pressed wood. It had an apparent specific gravity of 1.32 and was capable of taking a high polish.

The characteristics of the oil depend somewhat on the conditions during harvesting and storage. In general the oil prepared from freshly cut but mature plants is found to be lighter in color and milder in flavor than the oil secured from plants allowed to ripen to the open pod stage in the field. The first mentioned oil will hereinafter be referred to as number 1 oil while the latter will be referred to as number 2 oil. The younger seed produces a much lighter and milder oil than that obtained from the fully ripened seed. It has also been found that the quantity of oil diminishes with the storage time of the seed. Where upwards of 20% of oil can be obtained from fresh seed, the amount obtainable after a considerable storage period usually is less than 20% and indeed after one year was found to be as low as 17%.

*Physical characteristics of milkweed seed oil*

|  | No. 1 Oil | No. 2 Oil |
| --- | --- | --- |
| Color | Light straw, viz. slight greenish cast, like first pressing olive oil. | Slightly darker than No. 1. |
| Specific gravity | 0.912 | 0.912. |
| Refractive index $N_D^{20}$. | 1.47 | 1.47. |
| Acid value | 6.7 | 12.7. |
| Iodine number | 121.5 | 116-125. |
| Acetyl number | 6.5 | {8.76} {8.56} 8.66 av. |
| Saponification number. | 186 | 188. |
| Distillables below 200° C. 14 mm. Hg pressure. | 30% remainder polymerized. | 30% remainder polymerized. |

By careful control of the distillation, keeping the heating time to a minimum, a residue can be obtained which, while being partially polymerized, is still soluble in conventional thinner or solvent. From this partially polymerized oil with the use of a suitable drier such as a lead and cobalt drier, a hard film can be produced in 15-24 hours drying time at room temperature, or about 15 hours at 105° C. or in about 10 minutes with an infra red drying lamp. The film formed is flexible, tough and practically impervious to water.

A tough, water-impervious film can be formed on surfaces using the raw oil and drying with an infra-red lamp. The surfaces must be such as to withstand the heat generated. A dry film will form in 10 to 12 minutes on some surfaces or the raw oil will set to a dry film in 2 or 3 weeks when exposed to the air under normal room temperatures.

While various modifications of the invention have been described in detail, it is to be understood that the same is not limited thereto but may be varied within the scope of the appended claims.

What I claim is:

1. Process of preparing oil from milkweed seed which comprises removing the fin from the seed, and then subjecting the seeds to pressure while at a moisture content not substantially in excess of 8%.

2. Process of preparing oil from milkweed seed which comprises mechanically removing the fins from the seed, and then subjecting the seeds to pressure while at a moisture content not substantially in excess of 8%.

3. Process of preparing oil from milkweed seed which comprises subjecting seed to impact to remove fins therefrom, separating the fins from the seed and then pressing the oil from the seed at a moisture content not substantially in excess of 8%.

4. Process of preparing oil from milkweed seed which comprises subjecting the seed to impact by tumbling to remove fins therefrom and then pressing oil from the seed at a moisture content not substantially in excess of 8%.

5. Process of preparing oil from milkweed seed which comprises collecting seed from freshly cut but mature plants, mechanically removing the fins from the seeds and then pressing the seeds at a moisture content not substantially in excess of 8%.

6. Process of preparing oil from milkweed seed which comprises removing the fin from the seed, and then subjecting the seeds to pressure while at a moisture content not substantially in excess of 2-5%.

7. Process of preparing oil from milkweed seed which comprises removing the fin from the seed, and then removing the oil from the seed while at a moisture content not substantially in excess of 8%.

8. Process of preparing oil from milkweed seed which comprises removing the fin from the seed, heating the seed to an elevated temperature, and then subjecting the seeds to pressure while at a moisture content not substantially in excess of 8%.

9. Process of preparing oil from milkweed seed which comprises removing the fin from the seed, and then subjecting the seeds to pressure while at an elevated temperature and at a moisture content not substantially in excess of 8%.

CORTES F. REED.

REFERENCES CITED

The following references are of record in the file of this patent:

UNITED STATES PATENTS

| Number | Name | Date |
|---|---|---|
| 66,089 | Ingersoll | June 25, 1867 |
| 307,124 | Leder | Oct. 28, 1884 |
| 1,707,360 | McFarland | Apr. 2, 1929 |
| 2,015,242 | Stadt | Sept. 24, 1935 |

OTHER REFERENCES

Chemical Abstracts 30: 7887 (3).